United States Patent [19]

Yata et al.

[11] Patent Number: 4,753,717
[45] Date of Patent: Jun. 28, 1988

[54] POROUS ARTICLE HAVING OPEN PORES PREPARED FROM AROMATIC CONDENSATION POLYMER AND USE THEREOF

[75] Inventors: Shizukuni Yata, Hyogo; Yukinori Hato, Osaka; Takuji Osaki, Osaka; Kazuo Sakurai, Osaka, all of Japan

[73] Assignee: Kanebo Ltd., Tokyo, Japan

[21] Appl. No.: 842,335

[22] Filed: Mar. 21, 1986

[30] Foreign Application Priority Data

| Mar. 25, 1985 | [JP] | Japan | 60-58602 |
| Mar. 25, 1985 | [JP] | Japan | 60-58603 |
| Mar. 25, 1985 | [JP] | Japan | 60-58604 |
| Mar. 29, 1985 | [JP] | Japan | 60-63705 |
| Mar. 29, 1985 | [JP] | Japan | 60-63706 |
| Mar. 29, 1985 | [JP] | Japan | 60-63707 |
| Mar. 30, 1985 | [JP] | Japan | 60-65016 |

[51] Int. Cl.$^4$ .............. C25B 9/00; C25B 11/04; C25B 11/12; H01B 1/00
[52] U.S. Cl. ............... 204/242; 204/284; 204/292; 204/294; 252/500; 252/512; 252/518; 502/180; 502/416; 521/181
[58] Field of Search ............ 204/242, 284, 294, 59 R, 204/292; 252/500, 512, 518; 521/181; 429/194, 196, 197, 199; 502/180, 416, 402; 264/44

[56] References Cited

U.S. PATENT DOCUMENTS

| 3,825,506 | 7/1974 | Carter | 521/181 X |
| 4,337,139 | 6/1982 | Gestaut et al. | 204/294 X |
| 4,510,216 | 4/1985 | Nogami | 429/194 X |
| 4,519,985 | 5/1985 | Wells et al. | 502/416 X |
| 4,576,929 | 3/1986 | Shimazaki | 502/416 X |
| 4,582,575 | 4/1986 | Warren et al. | 204/59 R X |
| 4,601,849 | 7/1986 | Yata | 252/500 |
| 4,615,960 | 10/1986 | Yata | 429/194 |

*Primary Examiner*—Donald R. Valentine
*Attorney, Agent, or Firm*—Flynn, Thiel, Boutell & Tanis

[57] ABSTRACT

An insoluble and infusible substrate with a polyacene-type skelatal structure having a hydrogen/carbon atomic ratio of from 0.05 to 0.60 and containing open pores having an average diameter of not more than 10 micrometers, said substrate being a heat-treated product of an aromatic condensation polymer consisting of carbon, hydrogen and oxygen. The substrate, when doped with a dopant, gives an electrically conductive material. When having a specific surface area of at least 600 m$^2$/g, the substrate is especially useful as an electrode of an organic cell.

42 Claims, 4 Drawing Sheets

POROUS ARTICLE HAVING OPEN PORES PREPARED FROM AROMATIC CONDENSATION POLYMER AND USE THEREOF

This invention relates to an insoluble and infusible substrate with a polyacene-type skeletal structure having open pores (continuous pores that are not closed), an electrically conductive organic polymeric material obtained by doping the aforesaid substrate with a doping agent, and to an organic cell comprising the aforesaid material as an electrode and a solution in an aprotic organic solvent of a compound capable of forming dopable ions as an electrolytic solution.

Polymeric materials have excellent moldability, light weight and mass-producibility. Hence, organic polymeric materials having electrical semiconductivity obtained by making use of these properties of polymeric materials have been demanded in many industrial fields, most frequently by the electronics industry. Early organic semiconductors were difficult to mold into a film or plate, and had only limited applications because they did not have the properties of a n-type or p-type impurity semiconductor.

In recent years, organic semiconductors having relatively superior moldability have been developed. These semiconductors can be converted to n-type or p-type organic semiconductors by doping them with electron donating or accepting dopants. A typical example of such an organic semiconductor is polyacetylene. This organic semiconductor has an electrical conductivity of about $10^{-5}$ (ohm-cm)$^{-1}$, but its electrical conductivity can be greatly increased by doping it with an electron accepting dopant such as $I_2$ or $AsF_5$, or an electron donating dopant such as Li or Na, and electrical conductivities of $10^2$ to $10^3$ (ohm-cm)$^{-1}$ have been obtained with polyacetylene. Polyacetylene, however, lacks practical utility as an industrial material because it is susceptible to oxidation by oxygen and is difficult to handle in the air.

European Pat. No. 0067444 (corresponding to U.S. Ser. No. 386,816, now U.S. Pat. No. 4,601,849 and Japanese Laid-Open patent publication No. 136,649/1983), filed by one of the applicants of this application, discloses an electrically conductive organic polymeric material comprising (A) an insoluble and infusible substrate having a polyacene-type skeletal structure with a hydrogen/carbon atomic ratio of from 0.60 to 0.15 which is a heat-treated product of an aromatic condensation polymer composed of carbon, hydrogen and oxygen and (B) an electron donating doping agent or an electron accepting doping agent, said material having a higher electrical conductivity than the undoped substrate. This insoluble and infusible substrate has excellent heat resistance and oxidation resistance, and can be doped with the electron donating or accepting doping agent to give an organic semiconductor showing p-type or n-type properties. This European Patent, however, fails to give any description of a porous substrate or a porous organic semiconductor material.

European Laid-Open patent application No. 0149497 (corresponding to U.S. Ser. No. No. 690,799, now U.S. Pat. No. 4,615,960) filed by one of the applicants of this application discloses an electrically conductive organic polymeric material comprising (A) an insoluble and infusible substrate with a polyacene-type skeletal structure having a hydrogen/carbon atomic ratio of from 0.60 to 0.15 and a specific surface area, measured by the BET method, of at least 600 m$^2$/g, (B) in electron donating or accepting doping agent, said material having a higher electrical conductivity than the substrate. Since the specific surface area of this organic polymeric material is at least 600 m$^2$/g, it can be doped smoothly even with a dopant having a relatively large ion radius, such as $ClO_4^-$ or $BF_4^-$. The specification of this prior application fails to describe anything on a porous substrate or a porous organic semiconductor.

In recent years, there has been an increased tendency toward the reduction of the size, thickness and weight of electronic devices, and this has led to the need to reduce the size, thickness and weight of a cell constituting a power supply for the electronic devices. Nowadays, silver oxide cells find extensive use as a small-sized electric cell having high performance, and furthermore, lithium cells have been developed and come into commercial acceptance as a dry cell of a small thickness or a small-sized light-weight high-performance cell. Since, however, these cells are primary cells, they cannot be used for long periods of time by repeating charging and discharging. On the other hand, nickel and cadmium cells have been commercially used as a secondary cell of high performance, but have been found to be unsatisfactory in regard to the reduction of size, thickness and weight.

Lead batteries have long been used in various industrial fields as secondary cells of a large capacity, but suffer from the defect of having large weight. This cannot be avoided since they use lead peroxide and lead as electrodes. Attempts have recently been made to reduce the size of these batteries and improve their performance in order to use them as cells for electric automobiles, but have not proved to be commercially successful. There is still a strong demand for secondary cells having a large capacity and light weight.

As stated above, the cells now in commercial use have their own advantages and disadvantages, and are used selectively according to the intended uses. There has, however, been a strong need for the reduction of the size, thickness or weight of the cells. As a cell meeting such a need, a cell has recently been studied and proposed in which a thin film-like polyacetylene, i.e. an organic semiconductor, doped with an electron donating or accepting substance is used as an electrode active substance. This cell is a secondary cell having high performance and has a possibility of being reduced in thickness and weight. But it has the serious defect that polyacetylene is a very unstable substance which is easily oxidized by oxygen in air or thermally degenerated. Accordingly, an electric cell from this material must be produced in an inert gaseous atmosphere. In addition, there is a restriction on the production of polyacetylene in a form suitable as electrodes.

Japanese Laid-Open Patent Publication No. 35881/1983 proposes an electrochemical cell comprising carbon fibers having a specific area of 1,000 to 10,000 m$^2$/g as at least one of its electrodes. The specification of this Publication shows that the carbon fibers have a diameter of 10 to 20 micrometers, and are formed into a sheet or the like for use as an electrode.

It is an object of this invention to provide a porous organic semiconductor.

Another object of this invention is to provide a porous organic semiconductor having excellent heat resistance and oxidation resistance.

Still another object of this invention is to provide an organic semiconductor containing many open pores, which can be rapidly and uniformly doped with an electron accepting dopant and/or an electron donating dopant.

Yet another object of this invention is to provide an organic semiconductor containing many open pores, which can be rapidly and uniformly doped with an electron accepting dopant and/or an electron donating dopant having a relatively large ion radius.

European Laid-Open patent application No. 0149497 proposes an organic electrolytic cell comprising an insoluble and infusible substrate with a polyacene-type skeletal structure which is a heat-treated product of an aromatic condensation polymer composed of carbon, hydrogen and oxygen and has a hydrogen/carbon atomic ratio of 0.05 to 0.5 and a specific surface area, measured by the BET method, of at least 600 m$^2$/g as a positive electrode and/or a negative electrode, and a solution in an aprotic organic solvent of a compound capable of forming dopable ions in the electrode by electrolysis as an electrolyte solution. This cell is a secondary cell having a possibility of extensive application because it has high performance, can be reduced in thickness and weight and is easy to mold and the electrode active substance has high oxidation stability. Some problems, however, are still left in making this cell commercially acceptable. The most important problem is to increase the capacity of the cell, or in other words, to increase the amount of doping and increase the energy density that can be taken out.

A further object of this invention is to provide an organic semiconductor doped with an electron donating dopant and/or an electron accepting dopant.

A further object of this invention is to provide a porous organic semiconductor in the form of a film, a plate, etc.

A further object of this invention is to provide an organic semiconductor having fine open cells which easily permits various chemical reactions or physical adsorption.

A further object of this invention is to provide an organic electrolytic cell.

A further object of this invention is to provide an organic electrolytic cell having a large capacity per unit weight and a high energy density.

A further object of this invention is to provide an organic electrolytic cell comprising, as an electrode active substance, an organic semiconductor composed of an insoluble and infusible substrate with a polyacene-type skeletal structure.

A further object of this invention is to provide an economical organic electrolytic secondary cell which can be reduced in size, thickness and weight and is easy to produce.

A further object of this invention is to provide a secondary cell which has a high electromotive force and a low internal resistance and can be charged and discharged over a long period of time.

Additional objects of this invention along with its advantages will become apparent from the following description.

According to the present invention, these objects and advantages are achieved firstly by an insoluble and infusible substrate with a polyacene-type skeletal structure having a hydrogen/carbon atomic ratio of from 0.05 to 0.60 and containing open pores having an average diameter of not more than 10 micrometers, said substrate being a heat-treated product of an aromatic condensation polymer consisting of carbon, hydrogen and oxygen.

According to the present invention, the above objects and advantages are achieved secondly by an electrically conductive organic polymeric material comprising (a) an insoluble and infusible substrate with a polyacene-type skeletal structure having a hydrogen/carbon atomic ratio of from 0.05 to 0.60 and containing open pores having an average diameter of not more than 10 micrometers, said substrate being a heat-treated product of an aromatic condensation polymer consisting of carbon, hydrogen and oxygen, and (b) an electron donating doping agent, or an electron accepting doping agent, or both; said material having a higher electrical conductivity than the non-doped substrate (a).

According to the present invention, the above objects and advantages are achieved thirdly by an organic cell comprising a positive electrode, a negative electrode and an electrolytic solution, one or both of said positive and negative electrodes being composed of an insoluble and infusible substrate with a polyacene-type skeletal structure having a hydrogen/carbon atomic ratio of from 0.05 to 0.50, a specific surface area, measured by the BET method, of at least 600 m$^2$/g and containing open pores having an average diameter of not more than 10 micrometers, said substrate being a heat-treated product of an aromatic condensation polymer consisting of carbon, hydrogen and oxygen, and said electrolytic solution being a solution in an aprotic organic solvent of a compound capable of forming ions which can dope said electrode by electrolysis.

According to the present invention, the above objects and advantages are achieved fourthly by an organic cell comprising a positive electrode, a negative electrode and an electrolytic solution, one or both of said positive and negative electrodes being composed of porous active carbon having a specific surface area, measured by the BET method, of at least 600 m$^2$/g and containing open pores having an average pore diameter of not more than 10 micrometers, said substrate being a heat-treated product of an aromatic condensation polymer consisting of carbon, hydrogen and oxygen, and said electrolytic solution being a solution in an aprotic organic solvent of a compound capable of forming ions which can dope said electrode by electrolysis.

Figure 1:
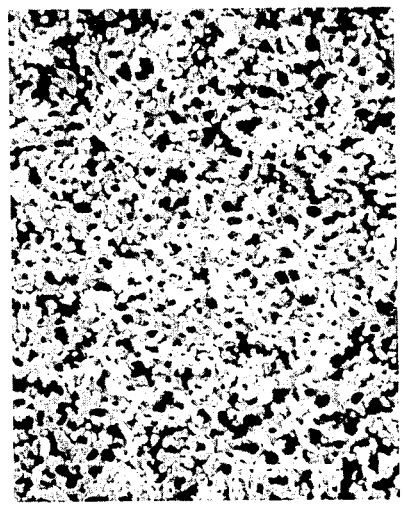
FIGS. 1 and 2 are electron micrographs of the sections of porous organic semiconductor film in accordance with this invention.

In each of these micrographs, the thick line shown at right bottom measures 5 micrometers.

The aromatic condensation polymer used in this invention is a condensation product between an aromatic hydrocarbon compound having a phenolic hydroxyl group and an aldehyde. Examples of suitable aromatic hydrocarbon compounds are phenols such as phenol, cresol and xylenol, but are not limited to these. For example, they may be methylene-bis-phenols represented by the following formula

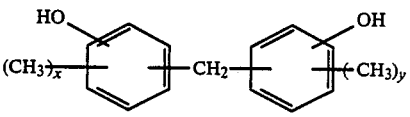

wherein x and y, independently from each other, represent 0, 1 or 2, or hydroxy-biphenyls and hydroxynaphthalenes. For practical purposes, phenols, particularly phenol, are preferred.

The aromatic condensation polymer used in this invention may also be a modified aromatic polymer from a aromatic hydrocarbon compound having a phenolic hydroxyl group partly replaced by an aromatic hydrocarbon compound having no phenolic hydroxyl group such as xylene and toluene, and an aldehyde, such as a condensation product of phenol, xylene and formaldehyde.

Examples of the aldehyde are formaldehyde, acetaldehyde and furfural. Formaldehyde is preferred. The phenol/formaldehyde condensate may be a novolak, or a resol, or a composition of both.

The insoluble and infusible substrate of this invention is a heat-treated product of the aromatic condensation polymer described above, and can be produced, for example, in the following manner.

A precondensate between an aromatic hydrocarbon compound having a phenolic hydroxyl group with or without an aromatic hydrocarbon compound having no phenolic hydroxyl group and an aldehyde is prepared, and an aqueous solution of the precondensate and an inorganic salt is formed. The aqueous solution is poured into a suitable mold, and heated while inhibiting evaporation of water, whereby it is cured and converted into such a form as a film or a cylindrical article. The cured article is then washed to remove the inorganic salt contained in it. The resultant porous cured condensate is heated to 400° to 800° C. in a non-oxidizing atmosphere.

The inorganic salt used together with the precondensate is a pore forming agent to form open pores in the cured article and is removed in a later step. Examples of the inorganic salt are zinc chloride, sodium phosphate, potassium hydroxide and potassium sulfide. Of these, zinc chloride is especially preferred. The inorganic salt is used in an amount 2.5 to 10 times the weight of the precondensate. If its amount is less than the lower limit, it is difficult to obtain a porous cured article having open pores. If, on the other hand, it is larger than the upper limit, the heat-treated product finally obtained undesirably tends to have a reduced mechanical strength. The aqueous solution of the precondensate and the inorganic salt can be prepared by using water in an amount 0.1 to 1 times the weight of the inorganic salt.

The aqueous solution having a viscosity of 100,000 to 100 poises is poured into a suitable mold, and heated to a temperature of, for example 50° to 200° C. It is important that during the heat-treatment, evaporation of water in the aqueous solution should be inhibited. It is thought that the precondensate undergoes heating in the aqueous solution and gradually cures and grows to a three-dimensional network structure while separating from the inorganic salt and water.

The inorganic salt can be removed from the cured product by washing it fully with water, dilute hydrochloric acid, etc. After the removal of the inorganic salt, the cured product is dried to give a porous cured condensate in which open pores are developed.

Since the porous cured condensate is of the three-dimensional network structure in the resin portion or open cells therein, it contains open pores into and out of which a fluid is permitted to flow easily. The pores have an average pore diameter of as small as not more than 10 micrometers, for example 10 to 0.03 micrometer. The porous condensate has a uniform diameter and a sharp pore diameter distribution. By properly selecting the composition of an aqueous solution of an uncured phenolic resin containing an inorganic salt and the heat-curing conditions, it is possible to obtain porous articles of varying pore diameters ranging from a very fine porous article having an average pore diameter of from 0.03 to 0.1 micrometer to a porous article having an average pore diameter of about 10 micrometers. Such articles, therefore, can be used in various fields, for example, as filters for separating relatively large particles, separators for electric cells, and separation of bacteria or colloidal particles. The porous cured condensate obtained has an apparent density of 0.3 to 0.7 g/cm$^3$.

The resulting porous cured condensate is then heated in a non-oxidizing atmosphere (including a vacuum) to a temperature of 400° to 800° C., preferably 450° to 750° C., especially preferably 500° to 700° C.

The preferred rate of temperature elevation during the heat-treatment slightly differs depending upon the type of the aromatic condensation polymer, its shape, the degree of the curing treatment, etc. Generally, the temperature can be elevated from room temperature to about 300° C. at a relatively rapid rate, for example 100° C./hour. At temperatures above 300° C., the thermal decomposition of the aromatic condensation polymer begins to evolve gases such as steam ($H_2O$), hydrogen, methane and carbon monoxide, and therefore, the temperature is advantageously elevated at a sufficiently slow rate.

The heat-treatment of the aromatic condensation polymer is carried out in a non-oxidizing atmosphere. The non-oxidizing atmosphere is, for example, nitrogen, argon, helium, neon or carbon dioxide. Nitrogen is preferably used. Such a non-oxidizing atmosphere may be stationary or fluidized.

The above heat-treatment consequently gives an insoluble and infusible substrate with a polyacene-type skeletal structure having a hydrogen/carbon atomic ratio (to be referred to as H/C ratio) of from 0.6 to 0.05 and containing open pores having an average pore diameter of not more than 10 micrometers.

When the porous cured condensate is fired (carbonized) at a temperature above 800° C. instead of heating it at 400° to 800° C., porous carbon having open pores with an average pore diameter of not more than 10 micrometers is obtained. Usually, the porous carbon has an apparent density of 0.3 to 0.8 g/cm$^3$ and a specific surface area, determined by the BET method, of not more than 400 m$^2$/g.

The porous cured condensate, the insoluble and infusible substrate and the porous carbon can be used, for example, as a separating material or an adsorbent material because they are porous and have heat resistance, chemical resistance and corrosion resistance.

Alternatively, a porous heat-treated product having developed open pores and a high specific surface area can be obtained by preparing a porous cured condensate by the aforesaid method, heating the cured product in a non-oxidizing atmosphere (including a vacuum) to a temperature of 350° to 800° C., preferably 350° to 700° C., especially preferably 400° to 600° C., thereafter washing the heat-treated product fully with water, dilute hydrochloric acid, etc. to remove the inorganic salt in it, and then drying the product. This product is an insoluble and infusible substrate with a polyacene-type skeletal structure having a hydrogen/carbon atomic ratio of from 0.6 to 0.05 and a specific surface area of at least 600 m$^2$/g and containing open pores having an average pore diameter of not more than 10 micrometeres.

The insoluble and infusible substrate of this invention has an H/C ratio of preferably from 0.6 to 0.05, more preferably from 0.6 to 0.15 and contains open pores with an average pore diameter of 0.03 to 10 micrometers.

The insoluble and infusible substrate of this invention usually has an oxygen/carbon atomic ratio (O/C ratio) of not more than 0.06, preferably not more than 0.03. X-ray diffraction (CuK$_\alpha$) shows that the main peak exists between $2\theta=20.5$ and $2\theta=23.5°$, and another broad peak exists between $2\theta=41$ and $2\theta=46°$. Its infrared absorption spectrum shows an absorbance ratio, $D(=D_{2900-2940}/D_{1560-1640})$, of usually not more than 0.5, preferably not more than 0.3.

It is seen therefore that in the above insoluble and infusible substrate, the polynuclear structure of the polyacene-type benzene is uniformly and moderately developed between polyacene-type molecules.

According to this invention, there is also provided as a porous organic semiconductor by doping the above insoluble and infusible substrate with an electron donating dopant, or an electron accepting dopant, or both.

Specifically, according to this invention, there is provided a porous organic semiconductor comprising (A) a porous insoluble and infusible substrate with a polyacene-type skeletal structure having a hydrogen/carbon atomic ratio of from 0.6 to 0.05 and containing open pores having an average pore diameter of not more than 10 micrometers, said substrate being a heat-treated product of an aromatic condensation polymer between an aromatic hydrocarbon compound having a phenolic hydroxyl group and an aldehyde, and (B) an electron donating dopant, an electron accepting dopant, or both.

A substance which easily liberates an electron is used as the electron donating dopant. Examples of preferred electron donating dopants are metals of Group IA of the periodic table such as sodium, potassium, rubidium and cesium.

Tetra(C$_1$-C$_4$ alkyl)ammonium cations such as (CH$_3$)$_4$N$^+$ or (C$_4$H$_9$)$_4$N$^+$ may also be used as the electron donating dopant.

On the other hand, a substance which easily accepts an electron is used as the electron accepting dopant. Examples of preferred electron accepting dopants include halogens such as fluorine, chlorine, bromine and iodine; halogen compounds such as AsF$_5$, PF$_5$, BF$_3$, BCl$_3$, BBr$_3$ and FeCl$_3$; oxides of non-metallic elements such as SO$_3$ and N$_2$O$_5$; and anions derived from inorganic acids such as H$_2$SO$_4$, HNO$_3$ and HClO$_4$.

Doping with the dopants may be carried out by substantially the same method as the doping methods previously used for polyacetylene and polyphenylene.

For example, when the dopant is an alkali metal, the substrate may be doped by bringing it into contact with a molten mass or a vapor of the alkali metal. Alternatively, the doping may be carried out by contacting the insoluble and infusible substrate with an alkali metal/naphthalene complex formed in tetrahydrofuran.

When the dopant is a halogen, a halogen compound or a non-metallic element oxide, the insoluble and infusible substrate may be easily doped by contacting it with a gas of such a dopant.

When the dopant is an anion derived from an inorganic acid, the doping may be carried out by directly coating or impregnating the inorganic acid on or in the insoluble and infusible substrate.

Alternatively, it is possible to install the insoluble and infusible substrate as an electrode, and electrochemically dope it with an electron donating dopant such as lithium or sodium or an electron accepting dopant such as ClO$_4^-$ or BF$_4^-$.

Since the insoluble and infusible substrate is a porous material having open pores, it has the excellent advantage that it permits easy diffusion of such a gaseous dopant or a dopant in solution therethrough, and can be doped rapidly and uniformly.

The organic semiconductor of the invention so obtained has a higher electrical conductivity than that (for example, $10^{-12}$ to $10^{-2}$ ohm$^1$·cm$^{-1}$) of the undoped insoluble and infusible substrate. For example, it is several times to $10^{10}$ times higher. Upon doping, the electron donating dopant gives an n-type semiconductor, and the electron accepting dopant, a p-type semiconductor. According to this invention, it is also possible to use the electron donating dopant and the electron accepting dopant together. When these dopants are present mixed nearly uniformly in the porous organic semiconductor of this invention, the semiconductor is either of a p-type or an n-type by dint of either of these dopants which is present in a larger amount. For example, when the electron donating dopant is present in a larger amount, the semiconductor is of the n-type, and when the electron accepting dopant is present in a larger amount, the semiconductor is of the p-type.

The organic cell provided by this invention uses the resulting insoluble and infusible substrate with a polyacene-type skeletal structure having a hydrogen/carbon atomic ratio of from 0.05 to 0.50 and a specific surface area, measured by the BET method, of at least 600 m$^2$/g and containing open pores with an average pore diameter of not more than 10 microns as at least one of the electrodes.

The organic electrolytic cell of this invention is an organic secondary cell comprising the aforesaid porous insoluble and infusible substrate as a positive electrode and/or a negative electrode and a solution in an aprotic organic solvent of a compound which upon electrolysis can form ions capable of being doped in the electrode as an electrolytic solution.

The compound which can form ions dopable in the electrode may, for example, be a halide, a perchlorate, a hexafluorophosphate, a hexafluoroarsenate or a tetrafluoroborate of an alkali metal or tetraalkylammonium. Specific examples include LiI, NaI, NH$_4$I, LiClO$_4$, LiAsF$_6$, LiBF$_4$, KPF$_6$, NaPF$_6$, (n-C$_4$H$_9$)$_4$NClO$_4$, (C$_2$H$_5$)$_4$NClO$_4$, (C$_2$H$_5$)$_4$NBF$_4$, (n-C$_4$H$_9$)$_4$NBF$_4$, (n-C$_4$H$_9$)$_4$NAsF$_6$, (n-C$_4$H$_9$)$_4$NPF$_6$ and LiHF$_2$.

To dissolve the above compounds, aprotic organic solvents are used. Examples of the solvents include ethylene carbonate, propylene carbonate, gamma-butyrolactone, dimethylformamide, dimethylacetamide, dimethyl sulfoxide, acetonitrile, dimethoxyethane, tetrahydrofuran, methylene chloride, sulfolane and mixtures of these. A solvent for a given compound used as the electrolyte is selected by considering the solubility of the electrolytic compound, the performance of the resulting cell, etc.

In order to minimize the internal resistance of the cell by the electrolytic solution, the concentration of the above compound in the electrolytic solution is desirably at least 0.1 mole/liter, and preferably 0.2 to 1.5 moles/liter in usual cases.

The cell action of the cell of this invention makes use of the electrochemical doping of the dopant into the insoluble and infusible substrate used as the electrode and its electrochemical undoping. In other words, energy is stored by the electrochemical doping of the dopant in the insoluble and infusible substrate, or is released outside by electrochemical undoping. Thus, the energy is taken outside or stored inside as an electrical energy.

The cell of this invention is of two types. A first type is a cell in which both the positive and negative electrodes are composed of the porous insoluble and infusible substrate. A second type is a cell in which the positive electrode is composed of the porous insoluble and infusible substrate and the negative electrode is composed of an alkali metal or an alkaline earth metal. Examples of the alkali and alkaline earth metals are cesium, rubidium, potassium, sodium, lithium, barium, strontium, and calcium. Of these, lithium is most preferred. These metals may be used singly or as an alloy.

The shape and size of the electrode composed of the insoluble and infusible substrate to be arranged within the cell can be selected depending upon the type of the desired cell. Since the cell reaction is an electrochemical reaction on the surface of the electrode, it is advantageous to maximize the surface area of the electrode. The insoluble and infusible substrate or the insoluble and infusible substrate doped with a dopant may be used as a current collector for taking out an electric current out of the cell from the substrate, but other electrically conductive substances having resistance to corrosion by the doping agent and the electrolyte solution, such as carbon, platinum, nickel and stainless steel, may also be used.

Figure 3:
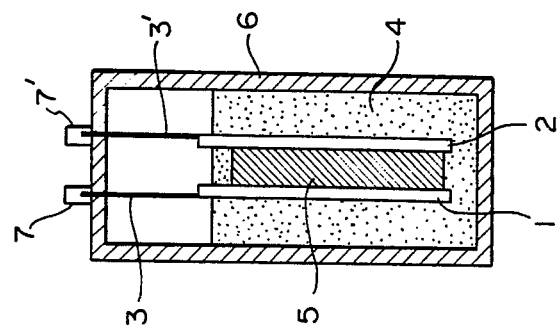
FIG. 3 is a schematic sectional view showing the basic structure of a cell in accordance with this invention.

Now, some embodiments of the cell of this invention will be described below with reference to FIG. 3 showing the basic structure of the cell of this invention.

The first-type cell of this invention comprising the insoluble and infusible substrates as both the positive and negative electrodes will first be described. In FIG. 3, a positive electrode 1 is made of the insoluble and infusible substrate in a film or plate form, and a negative electrode 2 is likewise made of the insoluble and infusible substrate in a film or plate form. These electrodes may, or may not, be doped with dopants. After building the cell, an electric voltage is applied from an exterior power supply to dope the electrodes with the dopant. For example, when both of the electrodes are made of the undoped insoluble and infusible substrate, the voltage of the cell after building is 0 V. By applying voltage from an external power supply and thereby doping both electrodes with the dopant, the cell attains an electromotive force. The cell has current collectors 3,3' for taking out current outside from the electrodes or supplying current for electrochemical doping, i.e. charging. The current collectors 3,3' are connected to the electrodes and external terminals 7,7' in a manner not to cause a drop in voltage. The cell further includes an electrolytic solution 4 composed of a solution in an aprotic organic solvent of the aforesaid compound capable of forming ions dopable into the positive and negative electrodes. Usually, the electrolytic solution is liquid, but to prevent leakage, it may be used as a gel or solid. The cell further comprises a separator 5 for preventing contact between the positive and negative electrodes and holding the elecrolytic solution. The separator 5 is made of a porous material which has durability against the electrolytic solution, the doping agent, or an electrode active substance such as an alkali metal, contains open pores, and is free from electron conductivity. Usually, it is made of a fabric, a nonwoven fabric or a porous article composed of glass fibers, polyethylene, polypropylene, etc. Desirably, the separator has a small thickness to reduce the internal resistance of the cell, but its thickness is determined by considering the amount of the electrolytic solution it holds, the flowability of the electrolytic solution through the separator, the strength of the separator, etc. The positive and negative electrodes and the separator are fixed within a cell casing 6 so as not to give rise to problems in use. The shape and size of the electrode are properly determined depending upon the shape and performance of the desired cell. For example, to produce a thin cell, the electrodes are suitably in the form of a film. To build a large capacity cell, a number of positive and negative electrodes in a film or plate form are alternately stacked.

The second-type cell of this invention comprising a positive electrode of the insoluble and infusible substrate and a negative electrode of an alkali metal or an alkaline earth metal will be described. With reference to FIG. 3, in the second-type cell, the negative electrode 2 is composed of an alkali metal or an alkaline earth metal. Other reference numerals have the same meanings as in the case of the first-type cell.

In the second-type cell, the doping mechanism, i.e. the cell operating mechanism, is twofold. According to a first mechanism, doping of the insoluble and infusible substrate with an electron accepting dopant corresponds to charging, and undoping corresponds to discharging. For example, a cell built by using the undoped insoluble and infusible substrate and lithium as the electrodes and a 1 mole/liter propylene carbonate solution of $LiClO_4$ as the electrolytic solution has an electromotive force of 2.5 to 3.0 V after building. When, a $ClO_4^-$ ion is doped into the insoluble and infusible substrate by applying voltage from an external power supply, the electromotive force of the cell rises to 3.5 to 4.5 V. According to a second mechanism, doping of an electrodonating dopant into the porous insoluble and infusible substrate corresponds to discharging, and undoping corresponds to charging. For example, a cell of the above construction has an electromotive force of 2.5 to 3.0 V after building. When a current is released outside and thus a lithium ion is doped into the insoluble and infusible substrate, the electromotive force of the cell is 1.0 to 2.5 V. When a lithium ion is undoped by applying voltage from an external power supply, the electromotive force of the cell is again 2.5 to 3.0 V.

The doping or undoping may be carried out at a fixed current or voltage, or under conditions where the current and voltage vary. The amount of the dopant to be doped in the insoluble and infusible substrate, however, is preferably 0.5 to 20% in terms of the number of ions doped per carbon atom of the substrate.

The cell of this invention comprising the porous insoluble and infusible substrate as an electrode is a secondary cell which can be repeatedly charged and discharged. Its electromotive force differs according to the construction of the cell. The first type has an electromotive force of 1.0 to 3.5 V. The second type has an electromotive force of 3.5 to 4.5 V when operated in accordance with the first mechanism, and 2.5 to 3.0 V when operated in accordance with the second mechanism. The cell of this invention particularly has a high energy density per unit weight thereof, and when doped in proper amounts, has an energy density of about 500 WH/kg of the insoluble and infusible substrate. The cell of this invention has a power density much higher than that of a lead battery although it differs depending upon the structure of the cell. Furthermore, the use of the porous insoluble and infusible substrate in this invention as an electrode can lead to the production of a secondary cell which has a low internal resistance, and can be repeatedly charged and discharged, and the performance of which does not decrease over an extended period of time.

The secondary cell produced by this invention comprises the porous insoluble and infusible substrate with a polyacene-type skeletal structure having better oxidation resistance, heat resistance, moldability and mechanical strength than known organic semiconductors as an electrode, and an electrolytic solution composed of a solution in an aprotic organic solvent of a compound capable of forming ions dopable in the electrode by electrolysis, and uses an electron donating or accepting dopant doped in the electrodes as an electrode active substance. It is a novel high-performance secondary cell having a very high capacity and a high output and capable of being reduced in size, thickness and weight.

According to this invention, there is also provided an organic cell in which at least one electrode is composed of porous active carbon having a specific surface area, measured by the BET method, of at least 600 $m^2/g$ and containing open pores having an average pore diameter of not more than 10 micrometers.

The porous active carbon can be produced by the same method as the method of producing the insoluble and infusible substrate having a specific surface area of at least 600 $m^2/g$, except that the cured product is fired (carbonized) in a non-oxidizing atmosphere instead of heat-treating it. Firing can usually be carried out until the temperature exceeds 800° C.

The porous active carbon usually has an apparent density (bulk density) of 0.2 to 0.6 $g/cm^3$. Namely, it has a relatively high porosity to a relatively low porosity. Usually, the mechanical strength of a porous material varies with its apparent density. The porous active carbon mentioned above has such a strength as can fully withstand use in practical applications even when its apparent density is, for example, 0.2 $g/cm^3$.

Since the porous active carbon has fine open pores, a fluid can smoothly come into and out of it, and because of its high specific surface area, has excellent activity. Moreover, since the porous active carbon can permit various types of physical adsorption on it smoothly and in great quantities by utilizing its fine open pores and high specific surface area, it can be suitably used not only as an electrode of an organic cell as stated above, but also as an adsorbent material or a separating material.

The organic cell of this invention comprising porous active carbon as at least one electrode basically has the same structure as the organic cell of this invention having the insoluble and infusible substrate as at least one electrode.

For example, a cell of the second type built by using undoped porous active carbon and lithium as electrodes and a 1 mole/liter propylene carbonate solution of LiClO$_4$ as an electrolytic solution has an electromotive force of about 3 V after building. When ClO$_4^-$ ions are doped into the porous active carbon by applying voltage from an external power supply, its electromotive force is 3.5 to 4.5 V. According to the second mechanism, doping of an electron donating dopant into porous active carbon corresponds to discharging, and undoping corresponds to charging. For example, the cell of the above structure has an electromotive force of about 3 V immediately after building. When lithium ions are doped into porous active carbon by releasing an electric current outside, its electromotive force is 1.0 to 2.5. When lithium ions are undoped by applying voltage from an external powder supply, the electromotive force again becomes about 3 V.

The doping or undoping may be carried out at a fixed current or voltage or under conditions where the current and voltage vary. But the amount of the dopant doped into the porous active carbon is preferably 0.5 to 10% in terms of the number of ions doped per carbon atom of the active carbon.

The cell of this invention comprising the porous active carbon as an electrode is a secondary cell which can be repeatedly charged and discharged. Its electromotive force differs according to the construction of the cell. The first type has an electromotive force of 1 to 3 V. The second type has an electromotive force of 3.5 to 4.5 V when operated in accordance with the first mechanism, and about 3 V when operated in accordance with the second mechanism. The cell of this invention particularly has a high energy density per unit weight thereof, and when doped in proper amounts, has an energy density of about 300 WH/kg of the porous active carbon. The cell of this invention has a power density much higher than that of a lead battery although it differs depending upon the structure of the cell. Furthermore, the use of the porous active carbon in this invention as an electrode can lead to the production of a secondary cell which has a low internal resistance, and can be repeatedly charged and discharged, and of which the performance does not decrease over an extended period of time.

The secondary cell of this invention comprising porous active carbon as one electrode permits easier incoming of an electrolytic solution than a conventional secondary cell comprising active carbon fibers as an electrode because the former uses porous active carbon. Furthermore, since doping on the interface is carried out smoothly, it is a secondary cell of high performance with a high capacity and a high output. It can be reduced in size, thickness and weight and its performance is not reduced over an extended period of time.

In the present application, the average pore diameter of open pores are measured and defined as follows:

A sample is photographed through an electron microscope at a magnification of 1,000 to 10,000 X. A given straight line is drawn across the micrograph, and the number of pores, n, which cross the straight line is counted. The average pore diameter ($\bar{d}$) is then calculated in accordance with the following equation.

$$d = \frac{\sum\limits_{i=1}^{n} li}{n}$$

wherein li is the length of a line segment cut by a pore that crosses the straight line, $$\sum\limits_{i=1}^{n} li$$

is the sum of the length of the n pores, and n is the number of pores which cross the straight line and is at least 10. The following examples illustrate the present invention more specifically.

EXAMPLE 1

(1) An aqueous solution prepared by mixing a water-soluble resol (about 60% in concentration), zinc chloride and water in a weight ratio of 10:25:4 was poured onto a glass plate by a film applicator to form a film. A glass plate is put over the aqueous solution formed into a film, and the film was heated at about 100° C. for 1 hour while inhibiting evaporation of water. The resulting cured film was washed with dilute hydrochloric acid and then with water, and dried to form a porous cured phenolic resin film having a thickness of about 200 micrometers.

The porous cured phenolic resin film was heat-treated in a siliconit electric furnace in a nitrogen stream to 600° C. at a temperature elevating rate of 40° C./hour to obtain an insoluble and infusible porous film. The porous film had an electrical conductivity, measured by a dc 4-terminal method, of $10^{-7}$ (ohm-cm)$^{-1}$. Its apparent density was 0.40 g/cm$^3$. The resulting film had excellent mechanical strength. By elemental analysis, the film had a hydrogen/carbon atomic ratio of 0.34. The X-ray diffraction pattern of the film was attributed to the polyacene-type skeletal structure, and had a broad main peak in the vicinity of $2\theta = 20-24°$, and a small peak in the vicinity of $2\theta = 41-46°$.

To observe the pores of the resulting film semiconductor, an electron micrograph of the section of the film was taken. The micrograph is shown in FIG. 1. It is seen from FIG. 1 that the resulting film had a three-dimensional network structure and contained fine open pores having a diameter of not more than 10 micrometers.

(2) A tetrahydrofuran solution of sodium naphthalate was prepared by using dehydrated tetrahydrofuran, naphthalene and metallic sodium. In a dry box, the semiconductor film obtained as above was immersed in the solution to perform doping at room temperature for about 1 hour. The doped semiconductor film was then washed with dehydrated about 10 hours. The dried semiconductor film had an electrical conductivity of about $10^{-1}$ (ohm-cm)$^{-1}$.

EXAMPLES 2-5

(1) A porous cured phenolic resin film having a thickness of about 200 micrometers obtained as in Example 1 was heated in a siliconit electric furnace in a nitrogen stream to each of the various temperatures shown Table 1 at a rate of about 30° C./hour. The resulting porous semiconductor film was subjected to elemental analysis and measurement of electrical conductivity, and the results are shown in Table 1.

(2) The semiconductor film was put in a vacuum line, and the degree of vacuum was adjusted to about $10^{-2}$. Iodine gas was introduced into the line at room temperature to perform doping for about 10 minutes. The electrical conducivity of the doped film is shown in Table 1.

The section of the resulting iodine-doped film was examined by an electron microanalyzer (EPMA) to determine the state of distribution of iodine. It was found that iodine was uniformly distributed in the film.

It is seen from the results of Table 1 that doping of iodine greatly increased the electrical conductivity of the porous semiconductor film.

TABLE 1

| Example | Heat-treatment temperature (°C.) | H/C ratio | Electrical conductivity (ohm-cm)$^{-1}$ | |
|---|---|---|---|---|
| | | | Before doping | After doping |
| 2 | 500 | 0.60 | $10^{-12}$ | $10^{-6}$ |
| 3 | 550 | 0.42 | $10^{-12}$ | $10^{-4}$ |
| 4 | 730 | 0.18 | $10^{0}$ | $10^{1}$ |
| 5 | 780 | 0.08 | $10^{1}$ | $10^{2}$ |

EXAMPLE 6

(1) An aqueous solution prepared by mixing a water-soluble resol (about 60% in concentration), zinc chloride and water in a weight ratio of 10:25:4 was poured onto a glass plate by a film applicator to form a film. A glass plate was put over the aqueous solution formed into a film, and the film as heated at about 100° C. for 1 hour while inhibiting evaporation of water.

The porous cured phenolic resin film was heat-treated in a siliconit electric furnace in a nitrogen strream to 450° C. at a temperaure elevating rate of 40° C./hour, washed with dilute hydrochloric acid and then water, and then dried to form a porous film having a thickness of about 200 microns, an apparent density of about 0.35 g/cm$^3$ and an excellent mechanical strength. The porous film had an electrical conductivity, measured by a dc 4-terminal method, of $10^{-7}$ (ohm-cm)$^{-1}$. By elemental analysis, the film had a hydrogen/carbon atomic ratio of 0.35. The X-ray diffraction pattern of the film was attributed to the polyacene-type skeletal structure, and had a broad main peak in the vicinity of $2\theta = 20-22°$, and a small peak in the vicinity of $2\theta = 41-46°$.

The film was found to have a BET specific surface area of as high as 2,100 m$^2$/g.

To observe the pores of the resulting film semiconductor, an electron micrograph of the section of the film was taken. The resulting film had a three-dimensional network structure and contained fine open pores having a diameter of not more than 10 micrometers.

(2) A tetrahydrofuran solution of sodium naphthalate was prepared by using dehydrated tetrahydrofuran, naphthalene and metallic sodium. In a dry box, the semiconductor film obtained as above was immersed in the solution to perform doping at room temperature for about 1 hour. The doped semiconductor film was then washed with dehydrated tetrahydrofuran, and dried under reduced pressure for about 10 hours. The dried semiconductor film had an electrical conductivity of about $10^{-1}$ (ohm-cm)$^{-1}$.

EXAMPLES 7-9

(1) A porous cured phenolic resin film having a thickness of about 200 micrometers obtained as in Example 1 was heated in a siliconit electric furnace in a nitrogen stream to each of the various temperatures shown Table 1 at a rate of about 30° C./hour. The porous semiconductor film was washed with dilute hydrochloric acid and water, and dried. The resulting porous semiconductor film was then subjected to elemental analysis and measurement of electrical conductivity and BET specific surface area. The results are shown in Table 2.

Figure 2:
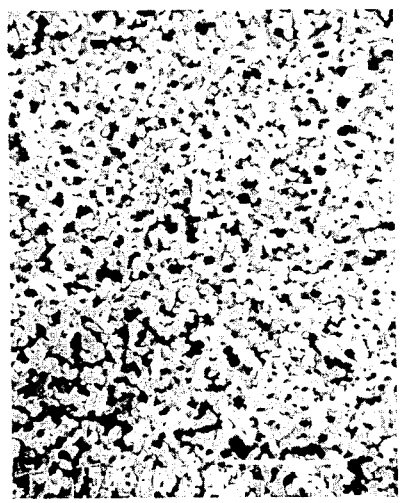

(2) $LiClO_4$ was dissolved in fully dehydrated propylene carbonate to form a solution having a concentration of about 1.0 mole/liter. Using Lithium metal as a negative electrode, the porous semiconductor film as a positive electrode, and the resulting solution as an electrolytic solution, $ClO_4^-$ ions were doped for about 1 hour by applying a voltage of about 4 V across the electrodes. The amount of doping was expressed as the number of $ClO_4^-$ ions per carbon atom of the semiconductor film. In the present invention, the number of $ClO_4^-$ ions was determined from the current flowing through the circuit. The doped porous film was then washed with acetone and dried under reduced pressure. Then, its electrical conductivity was measured. The results are shown in Table 2.

was taken. The micrograph is shown in FIG. 2. It is seen from FIG. 2 that the resulting film had a three-dimensional network structure and contained fine open pores having a diameter of not more than 10 micrometers.

(2) $LiClO_4$ was dissolved in fully dehydrated propylene carbonate to form an electrolyte solution having a concentration of 1.0 mole/liter. Using lithium metal as a negative electrode and the porous film semiconductor as a positive electrode, a cell was built as shown in FIG. 3. A felt of glass fibers was used as the separator, and a stainless steel mesh, as the current collector.

The amount of doping was expressed as the number of ions doped per carbon atom of the porous film substrate. In the present invention, the number of doped ions was determined from the current that flowed through the circuit.

A voltage was applied to the cell from an external power supply, and $ClO_4^-$ ions were doped for about 5 hours in the porous insoluble and infusible film substrate at such a current density that the amount of doping per hour became 1%. As a result, the cell was charged. Then, the cell was discharged at the same current density until the cell voltage reached 2.5 V.

Doping was carried out in a predetermined amount at the same current density as above to charge the cell. The cell was then discharged at the same rate to return

TABLE 2

| Example | Heat-treatment temperature (°C.) | H/C ratio | Electrical conductivity before doping (ohm-cm)$^{-1}$ | BET specific surface area (m$^2$/g) | Amount of $ClO_4^-$ doped (%) | Electrical conductivity after doping (ohm-cm)$^{-1}$ |
|---|---|---|---|---|---|---|
| 7 | 400 | 0.50 | $10^{-11}$ | 1950 | 1.5 | $10^{-4}$ |
| 8 | 500 | 0.28 | $10^{-4}$ | 2100 | 3.5 | $10^0$ |
| 9 | 700 | 0.08 | $10^0$ | 1900 | 2.8 | $10^1$ |

$ClO_4^{31}$ ions having a large ion radius could be doped smoothly within a short period of time because the porous semiconductors in accordance with this invention had fine open pores and a very high BET specific surface area.

EXAMPLE 10

(1) An aqueous solution prepared by mixing a water-soluble resol (about 60% in concentration), zinc chloride and water in a weight ratio of 10:25:4 was poured onto a glass plate by a film applicator to form a film. A glass plate was put over the aqueous solution formed into a film, and the film was heated at about 100° C. for 1 hour while inhibiting evaporation of water.

The porous cured phenolic resin film was heat-treated in a siliconit electric furnace in a nitrogen stream to 500° C. at a temperature elevating rate of 40° C./hour, washed with dilute hydrochloric acid and water, and then dried to form a porous film having a thickness of about 200 microns, an apparent density of about 0.35 g/cm$^3$ and an excellent mechanical strength. The porous film had an electrical conductivity, measured by a dc 4-terminal method, of $10^{-4}$ (ohm-cm)$^{-1}$. By elemental analysis, the film had a hydrogen/carbon atomic ratio of 0.27. The X-ray diffraction pattern of the film was attributed to the polyacene-type skeletal structure, and had a broad main peak in the vicinity of $2\theta=41$-22°, and a small peak in the vicinity of $2\theta=41$-46°.

The film had a specific surface area, measured by the BET method of as high as 2100 m$^2$/g.

Figure 4:
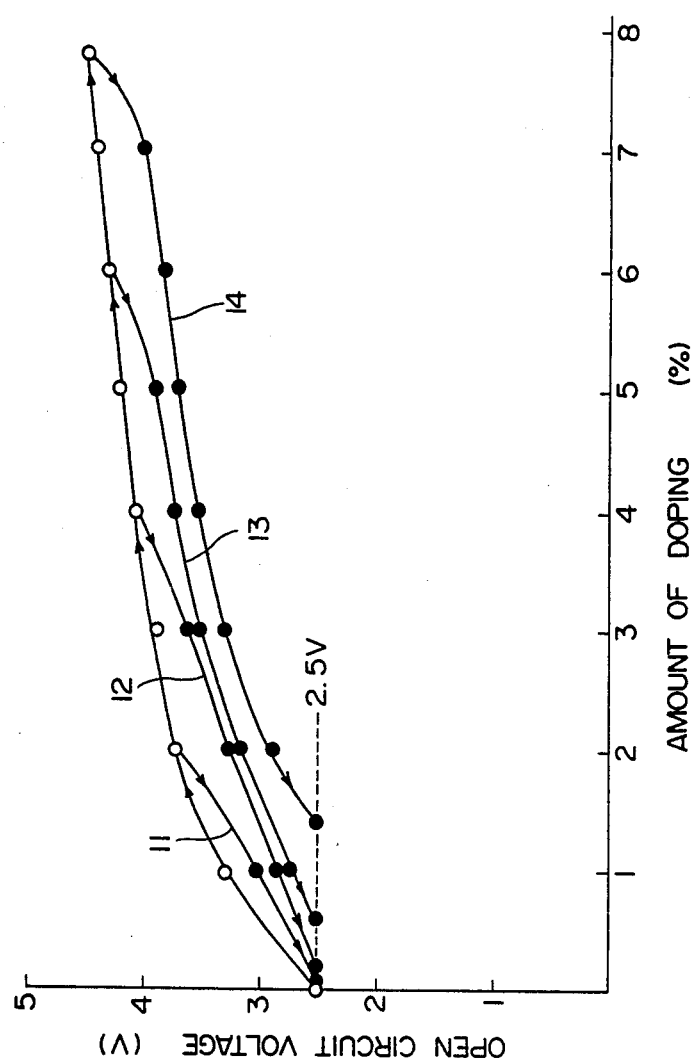
FIG. 4 is one example of the charging-discharging curve of an organic electrolytic cell in accordance with this invention.

To observe the pores of the resulting film semiconductor, an electron micrograph of the section of the film the voltage to 2.5 V. The results are shown in FIG. 4. In FIG. 4, the ordinate represents the open circuit voltage of the cell, and the abscissa, the amount of doping. White circles correspond to charging, and black circles, to discharging. Curve 11 is a discharge curve after 2% doping; curve 12, a discharge curve after 4% doping; curve 13, a discharge curve after 6% doping; and curve 14, a discharge curve after 8% doping.

After 8% doping, the electromotive force of the cell was about 4.5 V, and the efficiency of charging-discharging (the amount of discharging/the amount of charging) was about 80%, and the cell had a capacity of as high as about 150 mAH/g of the semiconductor. It had an energy density of about 500 WH/kg of the semiconductor. During these tests, the internal resistance of the cell was as good as about 20 ohms in spite of the fact that the electrode area was as small as about 2 cm$^2$.

EXAMPLES 11-13

(1) A phenol resin film having a thickness of about 200 micrometers obtained as in Example 10 was heated to each of the temperatures indicated in Table 3 at a rate of about 30° C./hour in a siliconit electric furnace in a nitrogen stream, washed with dilute hydrochloric acid and water, and dried to obtain a porous insoluble and infusible substrate film. The resulting porous substrate film was subjected to elemental analysis and measurement of BET specific surface area. The results are shown in Table 3.

(2) $LiBF_4$ was dissolved in fully dehydrated propylene carbonate to form a solution having a concentration of about 1.0 mole/liter. A cell was built by using the solution as an electrolytic solution, lithium metal as a negative electrode and the porous substrate film as a positive electrode.

The cell was charged for 6 hours by applying voltage from an external power supply at such a current density that the amount of doping per hour was 1%. The voltage of the cell after doping is shown in Table 3. The cell was then discharged at the same current density until the cell attained a voltage equal to that immediately after building of the cell. The charge efficiency, as the percentage of the amount of discharging based on the amount of charging, is shown in Table 3.

TABLE 3

| Example | Heat-treatment temperature (°C.) | H/C ratio | BET specific surface area (m²/g) | Voltage after doping (V) | Charge efficienty (%) |
| --- | --- | --- | --- | --- | --- |
| 11 | 400 | 0.47 | 1950 | 4.2 | 80 |
| 12 | 600 | 0.15 | 2000 | 4.4 | 85 |
| 13 | 700 | 0.08 | 1900 | 4.5 | 80 |

EXAMPLE 14

(1) A phenolic resin film having a thickness of about 200 micrometers obtained in the same way as in Example 10 was washed with water to remove part of zinc chloride contained therein. It was then put in a siliconit electric furnace, and heat-treated, washed and dried by the same procedure as in Example 10.

The porous film had an apparent density of about 0.40 g/cm$^3$, an excellent mechanical strength and an electrical conductivity of $10^{-5}$ (ohms-cm)$^{-1}$. By elemental analysis, the film was found to have a hydrogen/carbon atomic ratio of 0.32. It had a BET specific surface area of 800 m²/g.

(2) A cell was built in the same way as in Example 10 using the resulting porous substrate. After building, the cell had a voltage of 2.8 V. The cell was then charged for 6 hours at such a speed that the amount of doping per hour was 1%. The charged cell had an electromotive force of 4.3 V. Then, the cell was discharged at the same speed until its electromotive force became 2.8 V. Discharge could be effected for about 5 hours.

EXAMPLE 15

This example illustrates the first type cell of this invention in which both the positive and negative electrodes were composed of the porous insoluble and infusible substrate in accordance with this invention.

A cell was built by using the same porous substrate as used in Example 10 as the positive and negative electrodes and a 1 mole/liter propylene carbonate solution of (C$_2$H$_5$)$_4$NClO$_4$ as the electrolytic solution, and subjected to a charging-discharging test. Immediately after building, the cell had a voltage of 0 V. Then, by applying a voltage of 2.5 V from an external power supply for about 1 hour, ClO$_4^-$ ions were doped into the positive electrode, and (C$_2$H$_5$)$_4$N$^+$ ions, into the negative electrode. The electromotive force of the cell was 2.5 V as a matter of course. The cell was then discharged at such a speed that the amount of undoping per hour was 3%. In about 1 hour, the voltage of the cell returned to 0 V.

The above charging-discharging test was repeated through about 1000 cycles to determine the durability of the cell. No deterioration in cell performance was observed.

EXAMPLE 16

(1) An aqueous solution prepared by mixing a water-soluble resol (about 60% in concentration), zinc chloride and water in a weight ratio of 10:25:4 was poured onto a glass plate by a film applicator to form a film. A glass plate was put over the aqueous solution formed into a film, and the film as heated at about 100° C. for 1 hour while inhibiting evaporation of water.

The porous cured phenolic resin film was fired (carbonized) in a siliconit electric furnace in a nitrogen stream to 900° C. at a temperature elevating rate of 40° C./hour, washed with dilute hydrochloric acid and then water, and then dried. The resulting porous film having a thickness of about 200 microns and an apparent density of about 0.3 g/cm$^3$. It had so good mechanical strength as not to be able to be imagined from active carbon, and also had some flexibility. The film had a BET specific surface area of as high as 1800 m²/g.

Figure 5:
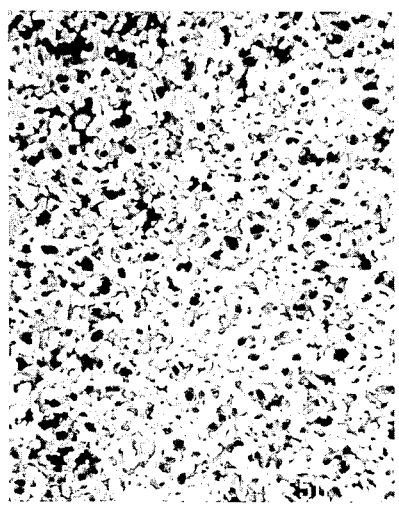
FIG. 5 is an electron micrograph of the section of a porous active carbon film in accordance with this invention.

To observe the pores of the resulting active carbon film, an electron micrograph of the section of the film was taken. The micrograph is shown in FIG. 5. It is seen from FIG. 5 that the resulting film had a three-dimensional network structure and contained fine open pores having a diameter of not more than 10 micrometers.

(2) A cell was built as shown in FIG. 3 using the resulting active carbon film as a positive electrode, metallic lithium as a negative electrode, and a solution of LiBF$_4$ in fully dehydrated propylene carbonate in a concentration of 1.0 mole/liter as an electrolytic solution. A stainless steel mesh was used as a current collector, and a felt of glass fibers, as a separator. This cell is of the second type in accordance with the first operating mechanism. Specifically, doping of BF$_4^-$, an electron accepting dopant, into the porous active carbon corresponds to charging, and undoping, to discharging. The amount of doping is expressed as the number of ions doped per carbon atom of the active carbon. In the present invention, the number of ions doped is determined from the current that flowed through the circuit.

Immediately after building, the cell had a voltage of 3.0 V. By applying voltage to the cell from an external power supply, BF$_4^-$ ions were doped in the porous active carbon for 3.5 hours at a fixed current so that the amount of doping per hour was 1%. After doping, the cell had an open circuit voltage of 4.4 V. Then, a fixed current was passed through the circuit so that the amount of undoping per hour became 1%. Thus, the BF$_4^-$ ions were undoped until the open circuit voltage reached 3.0 V. In the above test, the ratio of the amount of undoping to the amount of doping was 80%.

EXAMPLE 17

This example illustrates a secondary cell of the first type in this invention in which both the positive and negative electrodes were composed of a shaped article of porous active carbon.

A cell was built by using the porous active carbon film obtained in Example 16 as positive and negative electrodes and a 1 mole/liter propylene carbonate solution of (C$_2$H$_5$)$_4$NClO$_4$ as an electrolyte solution, and subjected to a charging-discharging test.

Immediately after building, the cell had a voltage of 0 V. Then, by applying voltage to the cell from an external power supply, ClO$_4^-$ ions were doped into the positive electrode, and (C$_2$H$_5$)$_4$N$^+$ ions, into the negative electrode. This charging was carried out for 3 hours at such a speed that the amount of doping per hour was 1%. The open circuit voltage at this time was 3.0 V. Then, the $ClO_4^-$ and $(C_2H_5)_4N^{30}$ ions were undoped at the same speed as in charging to discharge the cell. The discharging was continued until the cell voltage reached 0 V. The relation of the charging and discharge voltages to the amount of doping was nearly linear, and the cell had characteristics resembling those of a capacitor. Assuming that this cell is a capacitor, the capacity of the capacitor was calculated and found to be 25 F/g (F: farad).

COMPARATIVE EXAMPLE 1

A plain-weave fabric of Kaynol fibers (a fabric of phenolic resin fibers made by Japan Kaynol Co., Ltd.) was fired (carbonized) to 900° C. in a siliconit electric furnace in a non-oxidizing atmosphere. Then, steam was blown into the electric furnace at the same temperature to perform activating treatment for about 1 hour. The resulting active carbon fabric had a BET specific surface area of 1600 m²/g, and a fiber diameter of about 15 micrometers. The fabric had hardly any mechanical strength.

A cell was built in the same structure as in Example 17 using the active carbon fabric as positive and negative electrodes, and subjected to a charging-discharging test under the same conditions. Assuming that the cell was a capacitor, its capacity was calculated as 16 F/g.

EXAMPLE 18

An aqueous solution prepared by mixing a water-soluble resol (about 60% in concentration), zinc chloride and water in a weight ratio of 10:25:4 was poured onto a glass plate by a film applicator to form a film. A glass plate was put over the aqueous solution formed into a film, and the film was heated at about 100° C. for 1 hour while inhibiting evaporation of water. The resulting cured film was washed with dilute hydrochloric acid and then with water, and dried to form a porous cured phenolic resin film having a thickness of about 200 micrometers.

The porous cured phenolic resin film was fired (carbonized) to 1000° C. at a rate of 40° C./hour in a siliconit electric furnace in a nitrogen stream. The resulting film had an apparent density of about 0.4 g/cm³. Since it was made of glassy carbon, rubbing it did not produce carbon powder as in other porous carbon materials. This film had an excellent mechanical strength.

Figure 6:
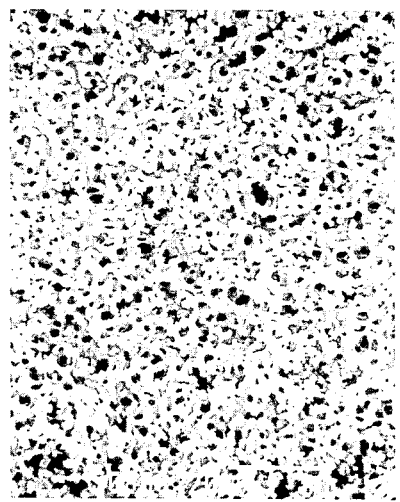
FIG. 6 is an electron micrograph of the section of a porous carbon film in accordance with this invention.

An electron micrograph of the section of the film was taken in order to observe the state of pores in the glassy carbon film. The micrograph is shown in FIG. 6. It is seen from FIG. 6 that the film had a three-dimensional network structure and contained fine open pores having a pore diameter of not more than 10 microns.

EXAMPLE 19

An aqueous solution prepared by mixing a watersoluble resol (about 60% in concentration), zinc chloride and water in a weight ratio of 10:25:4 was poured onto a glass plate by a film applicator. A polyester film was then put over the aqueous solution formed into the film, and the film was heated at about 100° C. for 1 hour to cure it. The resulting cured film was washed with dilute hydrochloric acid and then with water, and dried to obtain a porous cured phenolic resin film having a thickness of about 200 micrometers. The porous film had an apparent density of 0.60 g/cm³. It also had excellent flexibility and mechanical strength.

Figure 7:
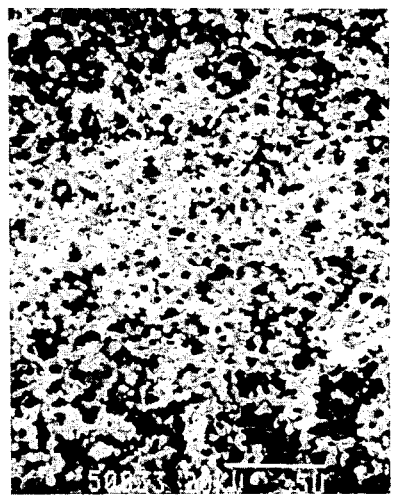
FIG. 7 is an electron micrograph of the section of a porous cured phenolic resin film in accordance with this invention.

An electron micrograph of the section of the film is shown in FIG. 7. The resin portion had a three-dimensional network structure, and an average pore diameter of not more than 10 micrometers.

What is claimed is:

1. An insoluble and infusible substrate with a polyacene-type skeletal structure having a hydrogen/carbon atomic ratio of from 0.05 to 0.60 and containing open pores having an average diameter of from 0.03 to 10 micrometers, said substrate being a heat-treated product of an aromatic condensation polymer consisting of carbon, hydrogen and oxygen.

2. The substrate of claim 1 which has a specific surface area, measured by the BET method, of at least 600 m²/g.

3. The substrate of claim 1 wherein the aromatic condensation polymer is a condensation product of an aromatic hydrocarbon compound having a phenolic hydroxyl group and an aldehyde.

4. The substrate of claim 1 wherein the aromatic condensation polymer is a condensation product of phenol and formaldehyde.

5. The substrate of claim 1 wherein the polyacene-type skeletal structure has a hydrogen/carbon atomic ratio of from 0.05 to 0.5.

6. The substrate of claim 1 wherein the polyacene-type skeletal structure has a hydrogen/carbon atomic ratio of from 0.15 to 0.60.

7. The substrate of claim 1 wherein the heat-treated product shows a three-dimensional network structure via the open pores.

8. An electrically conductive organic polymeric material comprising (a) an insoluble and infusible substrate with a polyacene-type skeletal structure having a hydrogen/carbon atomic ratio of from 0.05 to 0.60 and containing open pores having an average diameter of from 0.03 to 10 micrometers, said substrate being a heat-treated product of an aromatic condensation polymer consisting of carbon, hydrogen and oxygen, and (b) an electron donating doping agent, or an electron accepting doping agent, or both; said material having a higher electrical conductivity than the non-doped substrate (a).

9. The material of claim 8 wherein the insoluble and infusible substrate has a specific surface area, measured by the BET method, of at least 600 m²/g.

10. The material of claim 8 wherein the aromatic condensation polymer is a condensation product of an aromatic hydrocarbon compound having a phenolic hydroxyl group and an aldehyde.

11. The material of claim 8 wherein the aromatic condensation polymer is a condensation product of phenol and formaldehyde.

12. The material of claim 8 wherein the polyacene-type skeletal structure has a hydrogen/carbon atomic ratio of from 0.50 to 0.15.

13. The material of claim 8 wherein the heat-treated product shows a three-dimensional network structure via the open pores.

14. The material of claim 8 which has a direct-current electrical conductivity at room temperature of at least $10^{-4}$ ohm$^{-1}$cm$^{-1}$.

15. The material of claim 8 wherein the electron donating doping agent is a metal of Group IA of the periodic table.

16. The material of claim 8 wherein the electron accepting doping agent is a halogen selected from the groups consisting of fluorine, chlorine, bromine and iodine.

17. The material of claim 8 wherein the electron accepting doping agent is a halogen compound selected from the group consisting of $AsF_5$, $PF_5$, $BF_3$, $BCl_3$, $BBr_3$ and $FeCl_3$.

18. The material of claim 8 wherein the electron accepting doping agent is an oxide of a non-metallic element or an anion derived from an inorganic acid.

19. The material of claim 8 which is in the form of a molded article.

20. An organic cell comprising a positive electrode, a negative electrode and an electrolytic solution, one or both of said positive and negative, electrodes being composed of an insoluble and infusible substrate with a polyacene-type skeletal structure having a hydrogen/carbon atomic ratio of from 0.05 to 0.50, a specific surface area, measured by the BET method, of at least 600 $m^2/g$ and containing open pores having an average diameter of not more than 10, micrometers said substrate being a heat-treated product of an aromatic condensation polymer consisting of carbon, hydrogen and oxygen, and said electrolytic solution being a solution in an aprotic organic solvent of a compound capable of forming ions which can dope said electrode by electrolysis.

21. The organic cell of claim 20 wherein the aromatic condensation polymer is a condensation product of an aromatic hydrocarbon compound having a phenolic hydroxyl group and an aldehyde.

22. The organic cell of claim 20 wherein the aromatic condensation polymer is a condensation product of phenol and formaldehyde.

23. The organic cell of claim 20 wherein the hydrogen/carbon atomic ratio is from 0.1 to 0.35.

24. The organic cell of claim 20 wherein the open pores of the substrate have an average pore diameter of 0.03 to 10 micrometers.

25. The organic cell of claim 20 wherein the insoluble and infusible substrate has a three-dimensional network structure via the open pores.

26. The organic cell of claim 20 wherein the positive electrode is composed of the insoluble and infusible substrate and the negative electrode is composed of an alkali metal or an alkaline earth metal.

27. The organic cell of claim 26 wherein the negative electrode is composed of lithium.

28. The organic cell of claim 20 wherein both the positive and negative electrodes are composed of the insoluble and infusible substrate.

29. The organic cell of claim 20 wherein the compound capable of forming dopable ions is LiI, NaI, $NH_4I$, $LiClO_4$, $LiAsF_6$, $LiBF_4$, $KPF_6$, $NaPF_6$, $(C_2H_5)_4NClO_4$, $(n-C_4H_9)NClO_4$, $(C_2H_5)_4NBF_4$, $(N-C_4H_9)_4NBF_4$, $(n-C_4H_9)_4NAsF_6$, $(n-C_4H_9)_4NPF_6$ or $LiHF_2$.

30. The organic cell of claim 20 wherein the aprotic organic solvent is ethylene carbonate, propylene carbonate, gamma-butyrolactone, dimethylformamide, dimethylacetamide, dimethyl sulfoxide, acetonitrile, dimethoxyethane, tetrahydrofuran, methylene chloride or sulfolane.

31. The organic cell of claim 20 wherein the insoluble and infusible substrate is in the form of a film, a plate, or a composite thereof.

32. An organic cell comprising a positive electrode, a negative electrode and an electrolytic solution, one or both of said positive and negative electrodes being composed of porous active carbon having a specific surface area, measured by the BET method, of at least 600 $m^2/g$ and containing open pores having an average diameter of not more than 10 micrometers, said porous active carbon being a heat-treated product of an aromatic polymer consisting of carbon, hydrogen and oxygen, and said electrolytic solution being a solution in an aprotic organic solvent of a compound capable of ions which can dope said electrode by electrolysis.

33. The organic cell of claim 32 where the pores of the porous active carbon have an average pore diameter of 0.3 to 10 micrometers.

34. The organic cell of claim 32 wherein the pores spread in a three-dimensional network structure in the porous active carbon.

35. The organic cell of claim 32 wherein the porous active carbon has a bulk density of 0.2 to 0.6 $g/cm^2$.

36. The organic cell of claim 34 wherein the porous active carbon is in the form of a film, a plate or a composite thereof.

37. The organic cell of claim 32 wherein the positive electrode is composed of the porous active carbon and the negative electrode is composed of an alkali metal or an alkaline earth metal.

38. The organic cell of claim 32 wherein the negative electrode is composed of lithium.

39. The organic cell of claim 32 wherein both the positive and negative electrodes are composed of the porous active carbon.

40. The organic cell of claim 32 wherein the compound capable of forming dopable ions is LiI, NaI, $NH_4I$, $LiClO_4$, $LiAsF_6$, $LiBF_4$, $KPF_6$, $NaPF_6$, $(C_2H_5)_4NClO_4$, $(n-C_4H_9)NClO_4$, $(C_2H_5)_4NBF_4$, n-$C_4H_9)_4NBF_4$, $n-C_4H_9)_4NAsF_6$, $(n-C_4H_9)_4NPF_6$ or $LiHF_2$.

41. The organic cell of claim 32 wherein the aprotic organic solvent is ethylene carbonate, propylene carbonate, gamma-butyrolactone, dimethylformamide, dimethylacetamide, dimethyl sulfoxide, acetonitrile, dimethoxyethane, tetrahydrofuran, methylene chloride or sulfolane.

42. Porous active carbon having a specific surface area, measured by the BHT method, of at least 600 $m^2/g$ and containing open pores having an average pore diameter of from 0.03 to 10 micrometers.

* * * * *

UNITED STATES PATENT AND TRADEMARK OFFICE
CERTIFICATE OF CORRECTION

PATENT NO. : 4 753 717
DATED : June 28, 1988
INVENTOR(S) : Shizukuni YATA et al

It is certified that error appears in the above-identified patent and that said Letters Patent is hereby corrected as shown below:

Column 21, line 1; change "groups" to ---group---.
          line 21; after "10" delete the comma.
                  after "micrometers" insert a comma.
          line 56; change "(N-" to ---(n- ---.
Column 22, line 17; after "aromatic" insert ---condensation---.
          line 20; before "ions" insert ---forming---.
          line 22; change "where" to ---wherein---.
          line 24; change "0.3" to ---0.03---.
          line 30; change "claim 34" to ---claim 32---.

Signed and Sealed this

Seventeenth Day of January, 1989

Attest:

DONALD J. QUIGG

*Attesting Officer*      *Commissioner of Patents and Trademarks*